(12) United States Patent
Hess et al.

(10) Patent No.: US 6,712,093 B2
(45) Date of Patent: Mar. 30, 2004

(54) VALVE

(75) Inventors: Juergen Hess, Baden-Baden (DE); Georg Reeb, Buehl Eisental (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 10/030,837

(22) PCT Filed: Feb. 28, 2001

(86) PCT No.: PCT/DE01/00757

§ 371 (c)(1), (2), (4) Date: Jan. 10, 2002

(87) PCT Pub. No.: WO01/86178

PCT Pub. Date: Nov. 15, 2001

(65) Prior Publication Data

US 2003/0155019 A1 Aug. 21, 2003

(30) Foreign Application Priority Data

May 12, 2000 (DE) .......................................... 100 23 329

(51) Int. Cl.$^7$ ............................................ F16K 11/048
(52) U.S. Cl. ................................. 137/625.5; 137/625.29
(58) Field of Search ........................... 137/625.29, 625.5

(56) References Cited

U.S. PATENT DOCUMENTS

| 2,319,578 A | * | 5/1943 | Beekley et al. | ........ 137/625.27 |
| 2,931,376 A | * | 4/1960 | Hendel | ........ 137/625.5 |
| 3,262,464 A | * | 7/1966 | Frantz | ........ 137/625.5 |
| 3,495,623 A | * | 2/1970 | Jespersen | ........ 137/625.5 |
| 3,891,180 A | | 6/1975 | Bebinger | |
| 4,302,936 A | * | 12/1981 | Wheeler | ........ 137/625.5 |
| 5,685,519 A | * | 11/1997 | Bircann et al. | ........ 251/129.15 |
| 5,944,053 A | | 8/1999 | Kabierschke | |

FOREIGN PATENT DOCUMENTS

| DE | 197 53 575 A1 | 6/1999 |
| EP | 0 701 053 A2 | 3/1996 |

* cited by examiner

*Primary Examiner*—Gerald A. Michalsky
(74) *Attorney, Agent, or Firm*—Michael J. Striker

(57) ABSTRACT

A valve (10) has a valve housing (12), at least one inlet conduit (14) and at least one outlet conduit (16), a movable lifting rod (28), one end of which discharges into an actuator (68), and at least one valve member (30), which is secured to the lifting rod (28) and cooperates with at least one valve seat (20). The at least one valve member (30) upon opening of the at least one outlet conduit (16) emerges from the valve housing (12) of the valve (10).

7 Claims, 2 Drawing Sheets

VALVE

BACKGROUND OF THE INVENTION

The invention is based on a valve with a valve housing and inlet and outlet conduits, as well as a moveable lifting rod, one end of which discharges into an actuator. The valve further includes a valve member that is secured to the lifting rod and cooperates with at least one valve seat.

Such valves are known, for instance from German Patent Disclosure DE 197 53 575 A1. The valve described in DE 197 53 575 A1 is a magnetic bypass valve for a fluid-regulated heating or cooling system. Two valve members secured to a lifting rod of the valve regulate the flow between one inlet conduit and two outlet conduits; one of these outlet conduits assumes the function of a bypass conduit in the heating and cooling loop. One disadvantage of the valve described in DE 197 53 575 A1 is the great structural length of the valve, which claims a correspondingly large amount of installation space for the valve.

A further disadvantage of the valve described in DE 197 53 575 A1 is that in such valves, the valve member that controls the flow is itself an obstacle to the flow in the valve and thus affects the flow cross section in the region of the valve seat. One possible known solution to this problem is to increase the diameter of the outlet conduit of the valve. Enlarging the outlet conduit in turn means enlarging the installation volume required for the valve. Another disadvantage is that in that case the inlet conduit and the outlet conduit of the valve have different diameters. This requires the use of different connection hoses for the valve, which unnecessarily complicates the system.

In seeking to overcome this latter problem of the connection diameters, it is naturally possible first to enlarge the diameter of the outlet conduit and then keep the flow cross section around the valve member constant and then reduce the diameter again to the desired hose size. Not only does this rather contrived embodiment means a complex and thus expensive construction; inevitably it also means an increase in the structural length of the valve, with the familiar consequences in terms of the installation volume for the valve.

The described adaptation of the flow cross section of the valve is inconvenient, complex and thus too expensive for mass production.

SUMMARY OF THE INVENTION

The valve of the invention has the advantage, among others, that the structural length of the valve and along with it the installation volume of the valve can be reduced.

The valve according to the invention as proposed here opens in such a way that the valve cone emerges from the valve housing. On the one hand, this reduces the structural length of the valve, and at the same time it also offers the possibility of enlarging the flow diameter in the region of the valve cone. A complicated adaptation of the cross section inside the valve housing, which was previously necessary to adapt the flow cross section in the valve, becomes superfluous.

The valve seat of the valve of the invention is advantageously mounted on one end of the valve housing. As a result, upon opening of the valve, the valve member can move out of the valve housing and into an existing connection hose.

The connection hose of the valve leading to the other components of the applicable system is utilized, in the valve according to the invention, to give the valve member the necessary space upon opening: When the valve of the invention opens, the valve member moves out of the valve housing and into the connection hose that has been slipped over the outlet conduit. The connection hose seated on the outlet conduit provides an increase in cross section, which is utilized in the valve of the invention to make a correspondingly increased flow volume available in the region of the opened valve member. It is thus possible to attain that the flow cross section of the medium flowing through the valve is approximately the same in the region of the valve member as the flow cross section upstream of the valve member. The thus essentially constant flow volume in the valve minimizes the pressure drop across the valve. An excessive pressure drop across the valve is something that should be avoided.

Since in the valve housing itself no adaptation of the flow volume has to be made, the construction of the valve can be kept relatively simple. In particular, it is possible to dispense with an enlargement in the outlet conduit diameter of the valve for increasing the flow cross section in the region of the valve member. The valve is thus simplified markedly, since the requisite subsequent re-reduction in the diameter to adapt the connection cross sections can also be dispensed with. Thus the valve of the invention allows the use of hose material of only a single diameter, or makes complicated and expensive cross-sectional adaptations, which can also cause a pressure change across the valve, unnecessary.

The valve seats of the valve can be made integrally in the valve housing, which represents an additional simplification in the structure and thus a further reduction in the production cost of the valve of the invention. In particular, the valve seat can be disposed on the end of the valve housing. Depending on the design of the valve member, it then emerges to a greater or lesser extent from the valve housing upon opening of the valve, or in an extreme case does not emerge at all.

The valve of the invention, which when there is a flow around the valve cone shifts the requisite increase in valve conduit diameter into the connection hose itself, thus assures the requisite flow cross section while at the same time reducing the structural length of the valve.

BRIEF DESCRIPTION OF THE DRAWINGS

One exemplary embodiment of the invention, which is explained in greater detail in the ensuing description, is shown in the drawing.

Shown are.

DETAILED DESCRIPTION OF THE PREFERRED EMBODIMENT

Figure 1:
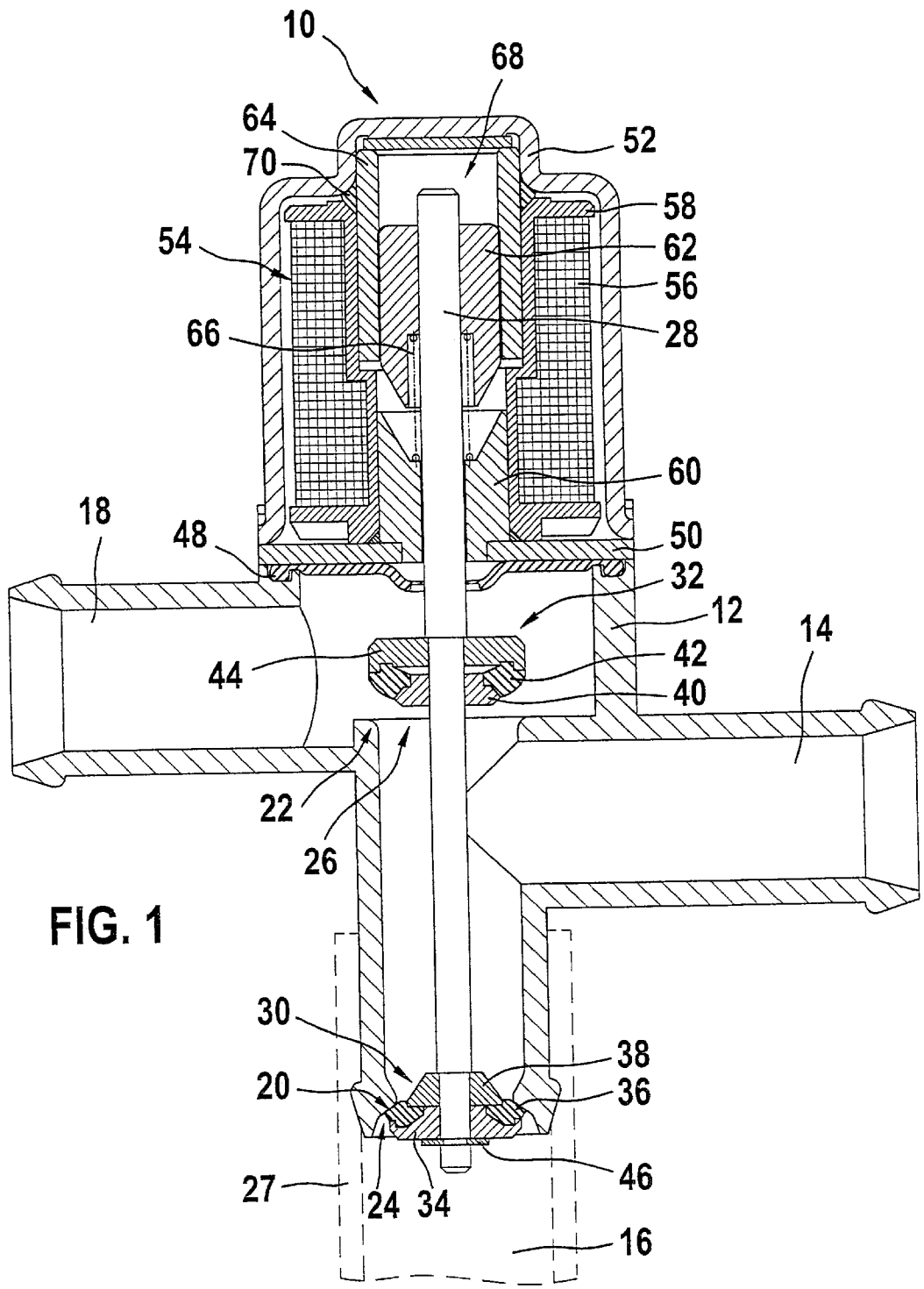
FIG. 1, a cross section through a valve according to the invention.

The valve 10 of the invention, shown in cross section in FIG. 1, has a valve housing 12, leading into which are one inlet conduit 14, a first outlet conduit 16, and a second outlet conduit 18. In the exemplary embodiment shown, the valve housing 12 has two valve seats 20 and 22. The respective valve seats 20 and 22 of the valve 10, in the exemplary embodiment shown, are made integrally from the valve housing 12 and each have a respective valve opening 24 and 26. The inlet conduit 14 discharges into the valve housing 12 between the valve seats 22 and 24 of the valve 10 of the invention. The valve opening 24 connects the inlet conduit 14 to the first outlet conduit 16 and to a connection hose 27. This connection hose 27 is slipped over the valve opening 24 and lengthens the outlet conduit 16 of the valve 10. The valve opening 26 connects the inlet conduit 14 to the second outlet conduit 18.

Leading through the valve housing 12 is a lifting rod 28, with a first valve member 30—in FIG. 1, the lower valve member—which is located in the first outlet conduit 16 on the side of the valve seat 20 remote from the inlet conduit 14. The valve member 30 comprises a lower sealing cone 34, on the side of the valve member 30 remote from the inlet conduit 14, and an upper sealing cone 38, on the side of the valve member 30 toward the inlet conduit 14. An elastic sealing element 36 is placed between the two sealing cones 34 and 38 of the valve member 30. The valve member 30 cooperates with the valve seat 20 of the valve housing 12 and controls the first outlet conduit 16. Thus the outlet conduit 16 is closed—as shown in FIG. 1—for instance if the sealing element 36 of the valve member 30 is seated solidly on the valve seat 20. In the version of the valve according to the invention, the valve member 30 is secured to the lifting rod 28 by a securing shim 46. It is also possible to secure it by wedging the sealing cone 34 into a groove of the lifting rod 28 or by means of material comprising the lifting rod 28 that is pressed against the valve member 30.

On the side of the valve seat 22 remote from the inlet conduit 14, the lifting rod 28 has a second valve member 32. The valve member 32, which provides a connection between the inlet conduit 14 and the second outlet conduit 18, likewise comprises one lower sealing cone 40, oriented toward the inlet conduit, and one upper sealing cone 44, oriented toward the second outlet conduit 18. An elastic sealing element 42 is placed between the two sealing cones 40 and 44 of the valve member 32.

The end of the lifting rod 28 opposite the first valve member 30—the upper end in FIG. 1—is extended out of the valve housing 12 through a sealing cuff 48, which contacts the lifting rod 28, and through a supporting wall 50 and discharges into a coil housing 52.

An electromagnetic coil 54 with windings 56 on a coil carrier 58 and a magnet core 60 are located in the coil housing 52. The end of the lifting rod 28 extended into the coil housing has an armature 62, which is solidly connected to the lifting rod 28 and which is movable together with the lifting rod 28 in the axial direction in an armature guide 64 in the interior of the coil 54. Support springs 66 that act counter to the magnet core 60 of the coil 54 are mounted on the armature 62. The armature 62 and the lifting rod 28 fixed in it are surrounded by the windings 56 of the coil 54. In conjunction with an electric current flowing through the windings 56 of the coil 54 and with the armature secured to the lifting rod 28, the electromagnetic coil 54 forms the actuator 68 of the valve 10 in this exemplary embodiment. Depending on the flow of current through the windings 56 of the coil 54, the armature 62 and thus the lifting rod 28 secured to the armature, with its valve members 30 and 32, assume various switching positions of the valve 10. The end of the lifting rod 28 toward the armature and the coil 54 surrounding that end are protected from the outside by the coil housing 52. An O-ring 70 seals off both the armature guide 64 and the coil carrier 58 from the coil housing 52. The coil housing 52 is secured to the valve housing 12 via the supporting wall 50.

Figure 2:
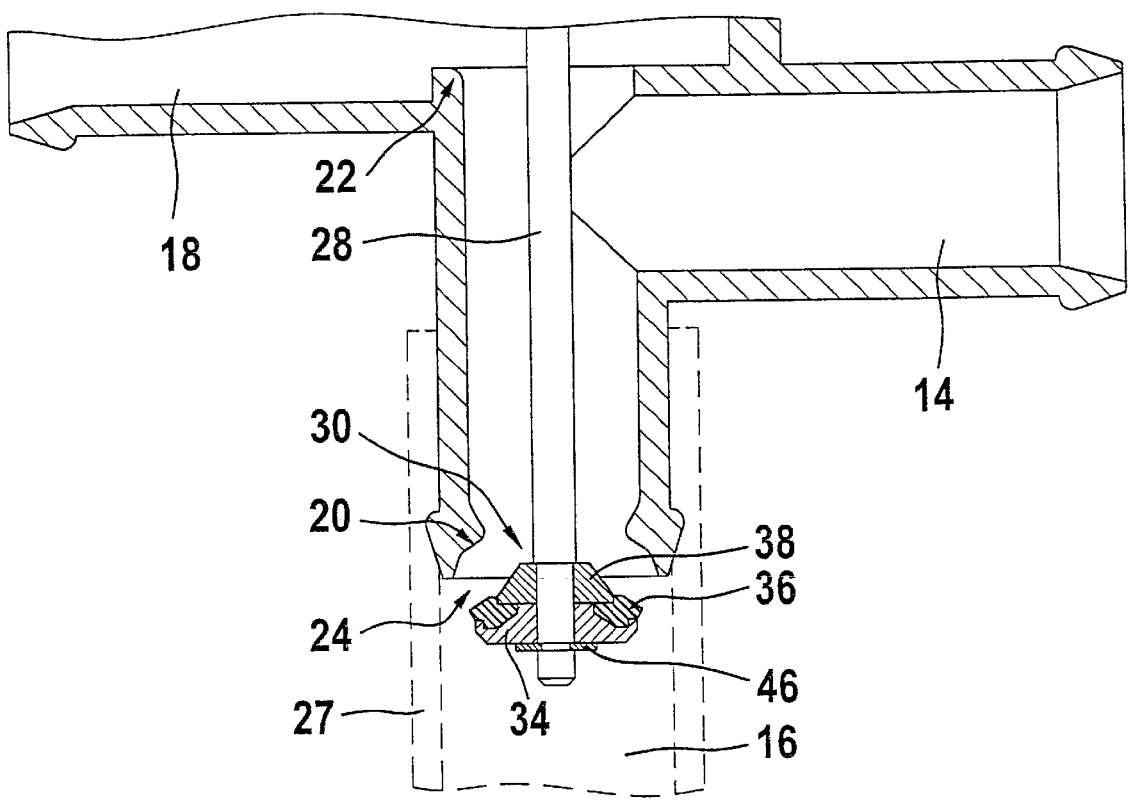
FIG. 2, a detail of the cross section of the valve of the invention in accordance with FIG. 1, in the open valve position.

FIG. 2 shows a detail of the cross section of the valve 10 of the invention, with the first outlet conduit 16 open. The inlet conduit 14 and the outlet conduit 16 are shown. Also visible is the lower end, remote from the actuator, of the lifting rod 28 that has the valve member 30.

In this view of the valve 10 of the invention, the sealing element 36 of the valve member 30 has been lifted from the valve seat 20, embodied here directly on the end of the valve housing 12, by actuation of the actuator 68 and has uncovered the valve opening 24. For that purpose, the valve member 30 secured to the lifting rod 28 emerges from the outlet conduit 16 and thus from the valve housing 12 of the valve 10 entirely and is guided in the connection hose 27 in such a way that the larger cross section of the connection hose 27, which in this exemplary embodiment is slipped over the outlet conduit 16, makes a larger flow cross section around the valve member 30 possible. To close the outlet conduit 16, the valve member 30 is pulled back out of the hose 27 and back onto the valve seat 20 embodied on the inside of the valve housing 12 of the valve 10.

The invention is not limited to the described exemplary embodiment of an electromagnetic valve with two valve members.

It can equally advantageously be realized in a valve that has only one outlet conduit and thus has only one valve member on the lifting rod. The valve housing itself, in other exemplary embodiments, can also have an specially made valve chamber as well. Nor is the valve of the invention necessarily associated with the use of an electromagnetic actuator.

The valve of the invention is not limited to the use of valve seats embodied integrally on the valve housing. In other embodiments of the valve of the invention, both the shape and the material of both the valve seats and the valve members can be varied.

Other possibilities for connecting the valve of the invention besides those described in the exemplary embodiment are also conceivable. The valve is not limited to the use of a connection hose. For instance, the valve member could also move directly into an add-on part—which for instance is flanged to the outlet conduit.

What is claimed is:

1. A magnetic valve for water-related control of a heating/cooling system of a motor vehicle, having a valve housing, having at least one inlet conduit and at least one outlet conduit, having a movable lifting rod one end of which discharges into an electromagnetic actuator, and having at least one valve member, which is secured to the lifting rod and cooperates with at least one valve seat, wherein in a first switch position of the actuator, the at least one valve member creates a connection between the at least one inlet conduit and the at least one outlet conduit and wherein in a second switch position of the actuator, the at least one valve member disables the connection, wherein the at least one valve member emerges from the valve housing upon opening of the valve, wherein the valve housing has a second outlet conduit with an associated valve member and valve seat.

2. The valve of claim 1, wherein the at least one valve member, upon opening of the valve, moves into a connection line of the valve, which line communicates with the valve housing.

3. The valve of claim 2, wherein the at least one valve member, upon opening of the valve, emerges so far out of the valve housing and moves so far into the connection line seated on an outlet conduit of the valve that the flow cross section of the medium flowing through the valve is approximately the same both upstream and downstream of the at least one valve member.

4. The valve of claim 1, wherein diameters of the at least one inlet conduit (14) and of the at least one outlet conduit (16) of the valve (10) are approximately equal.

5. The valve of claim 4, wherein the valve seat of the at least one valve member is made integrally on the valve housing.

6. The valve of claim 1, a diameter of the second outlet conduit of the valve is equal to a diameter of the at least one inlet conduit of the valve.

7. The valve of claim 1, wherein the valve seat of the at least one valve member is disposed on one end of the valve housing.

* * * * *